United States Patent [19]

Mitchell et al.

[11] E Re. 28,563

[45] Reissued Sept. 30, 1975

[54] METHOD FOR FABRICATION OF PLASTIC FOOTWEAR

[76] Inventors: Winalee G. Mitchell; James G. Mitchell, both of 26920 W. River Road, Perrysburg, Ohio 43551

[22] Filed: Nov. 27, 1973

[21] Appl. No.: 419,462

Related U.S. Patent Documents

Reissue of:

[64] Patent No.: 3,238,079
Issued: Mar. 1, 1966
Appl. No.: 236,882
Filed: Nov. 13, 1962

[52] U.S. Cl. ..... 156/252; 12/142 R
[51] Int. Cl.[2] ..... B32B 31/00; A43D 9/00
[58] Field of Search ..... 156/250–253, 156/258, 263, 264, 265, 267; 12/142 R, 142 E, 142 EV

[56] References Cited

UNITED STATES PATENTS

| | | | |
|---|---|---|---|
| 637,136 | 11/1899 | Lemmermann | 156/251 |
| 1,388,762 | 8/1921 | Riley | 156/251 |
| 1,830,471 | 11/1931 | Le Dorf | 36/10 |
| 2,002,527 | 5/1935 | Dorogi et al. | 156/251 |
| 2,076,079 | 4/1937 | Gammeter | 156/251 |
| 2,153,351 | 4/1939 | Steinberger | 156/251 |
| 2,288,199 | 6/1942 | Levy | 36/10 |
| 3,026,233 | 3/1962 | Scholl et al. | 156/251 |
| 3,149,355 | 9/1964 | Greene | 156;12/251;142 R |

FOREIGN PATENTS OR APPLICATIONS

| | | | |
|---|---|---|---|
| 129,014 | 4/1932 | Austria | 156/251 |

*Primary Examiner*—Douglas J. Drummond
*Attorney, Agent, or Firm*—Robert R. Priddy; Burton A. Amernick

[57] ABSTRACT

*A method for manufacturing slippers comprising forming an elongated foot opening in a first sheet of a synthetic polymeric sheeting material; then bringing the first sheet together with a second sheet of synthetic polymeric sheeting material in face-to-face relationship; exerting firm pressure on the exposed faces of the sheet in at least one narrow region surrounding the foot opening; raising the temperature of the sheets within the region to unite the sheets with one another within the region; and separating a slipper from the material lying outside of the region.*

34 Claims, 11 Drawing Figures

INVENTORS
WINALEE G. MITCHELL
BY JAMES G. MITCHELL
Robert R. Priddy
THEIR AGENT

INVENTORS
WINALEE G. MITCHELL
JAMES G. MITCHELL
BY Robert R. Priddy
THEIR AGENT

INVENTORS
WINALEE G. MITCHELL
JAMES G. MITCHELL
BY Robert R. Priddy
THEIR AGENT

METHOD FOR FABRICATION OF PLASTIC FOOTWEAR

Matter enclosed in heavy brackets [ ] appears in the original patent but forms no part of this reissue specification; matter printed in italics indicates the additions made by reissue.

---

There appears to be no widespread availability of "disposable" footwear at present, despite the many advantages which can be realized from the use of such footwear. This is indeed unfortunate, since persons often find themselves in situations in which conventional foot apparel offers something less than ideal comfort or utility.

Some early attempts were made at fabricating crude foot-coverings of paper for use in public places where people commonly go barefoot, such as in the locker-room areas of public swimming pools, for example. These attempts, however, met with little success, due to the well-known effects of water on paper. The advent of plastic material in cellular and non-cellular sheets made available a water-resistant substitute for paper. In view of the availability of better demonstrable and the demonostrable benefits to be obtained through the utilization of strong sanitary plastic footwear, it may seem surprising that such footwear has not become a standard household item.

One explanation for this rather surprising state of affairs is an apparently complete lack of knowledge as to how these new materials should be employed in the fulfillment of the need for products of this type. Should the article be made from a single piece of material or from several? How should the one or more pieces be shaped to produce an article that will not tear or split apart prematurely? What methods should be used for manufacturing such articles? Clearly, there is an existing need for strong, sanitary and inexpensive footwear and for efficient methods of making such footwear.

It is a principal object of this invention to fill this need. Other objects and advantages of the invention are discernible from the following description of preferred embodiments of the novel footwear and method of the present invention. The invention will be described in conjunction with the accompanying drawings, in which.

Figure 1:
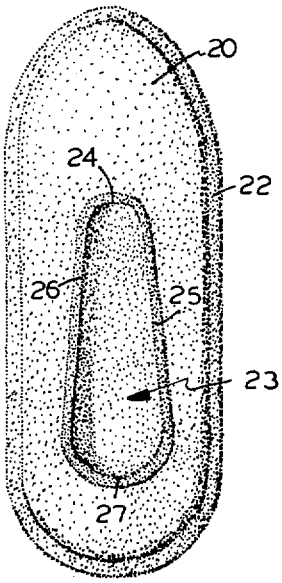
FIG. 1 is a top plan view of a novel slipper corresponding with the invention.
Figure 2:
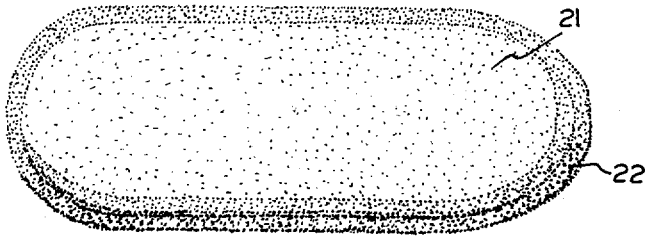
FIG. 2 is a bottom plan view thereof.
Figure 3:
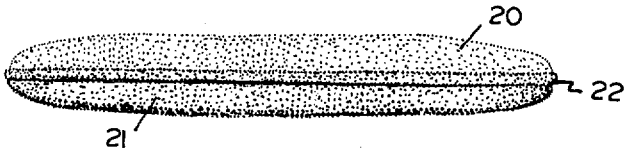
FIG. 3 is a side elevation thereof.

Generally speaking, the objects of the present invention are attained in part by a slipper which includes an upper, having a foot-opening therein and a lower joined to said upper, said upper and lower being a pair of similarly-shaped, flat pieces of foot-conformable plastic material joined together in a narrow region about their peripheries. An embodiment of our slipper invention is shown in FIGS. 1–3. This embodiment comprises an upper 20 and a lower 21 of plastic material. By "plastic" is meant any material resembling a natural or synthetic rubber in its properties. It should be flexible, stretchy and preferably, though not necessarily, spongy. That is, the material preferably possesses a cell structure. A preferred example of such spongy materials having cell structure is polyurethane foam, a polymeric material which is ordinarily produced by "blowing" a polyester resin with the aid of a diisocyanate compound.

The upper and lower should have similar shapes, preferably the same shape. That shape should conform closely enough to that of the human foot so that the elasticity of the material will be sufficient to compensate for differences between the outline of the slipper and that of the foot, if any. In this embodiment, an irregular oval shape is used because it will fit either the left or right foot equally well.

The upper 20 and lower 21 lie one on top of the other and are joined to one another about their peripheries along a seam 22. It should be noted that this seam will be hidden from view to a substantial extent when the slipper is turned inside out.

Any effective method of joinder can be utilized. Sewing, cementing, thermal sealing and induction sealing are a few examples. With polyurethane foams, we prefer to use the thermal sealing method, which will be explained further below.

As can be seen in FIG. 1, the slipper disclosed herein has a foot-opening 23 in the upper, a rounded front edge 24, two side edges 25 and 26 diverging from one another towards the heel of the slipper and meeting in a rounded trailing edge 27.

Although there is no intention to limit the invention to slippers of particular dimensions, some dimensions will be given for illustrative purposes. In a man's large (sizes 10–12) slipper corresponding in shape to the FIGS. 1–3 embodiment, having a lower of stretchy one-fourth inch thick polyurethane foam and an upper of the same material three-sixteenths inch thick, the overall length of the slipper is about 10 inches; width, about 4 inches; length of the foot opening about 4¾ inches (set back 3 inches from the toe), the foot opening having a curved front end with a radius of about five-eighths inch, a curved rear end with a radius of about seven-eighths inch and divergent side edges joined tangentially with said front and rear ends. It is possible to vary the above radii, widths, lengths and set back within a given foot size to whatever extent is desired, so long as the final product will serve its intended purpose. Obviously these dimensions will also vary widely throughout the range of sizes needed to fit the feet of any child or adult. Therefore, the above dimensions are not to be construed as limiting the invention in any sense, but only as an illustration of a single embodiment thereof.

We have discovered some novel methods useful for making a wide variety of slippers. They will be illustrated in connection with the fabrication of two different slippers.

Generally speaking, the first method we have invented involves a series of steps, including: forming a foot-opening in a first sheet of plastic material; bringing said first sheet and a second sheet of said material into face to face contact with one another; uniting said sheets in any suitable manner in a narrow region spaced outwardly from said foot-opening, said region having an outline generally conformable to the human foot; and separating a slipper from the material lying outside the region. By "forming" is meant any effective step or steps capable of producing a sheet with an opening in it, such as cutting, molding, shearing, punching and the like. Although the literal terms "first sheet" and "second sheet" may connote the presence of two separate sheets in some contexts, those terms are used herein to refer also to separate portions of a single sheet. Thus, "bringing said first sheet and a second sheet of said material into face to face contact" is intended to embrace not only the idea of bringing separate sheets together but also the idea of folding over a double-sized single sheet to produce the same result. By "uniting" is meant any fastening, sealing, sewing, cementing or other joining technique. The term "separating" includes any method of parting the completed slipper from the excess material.

Figure 4:
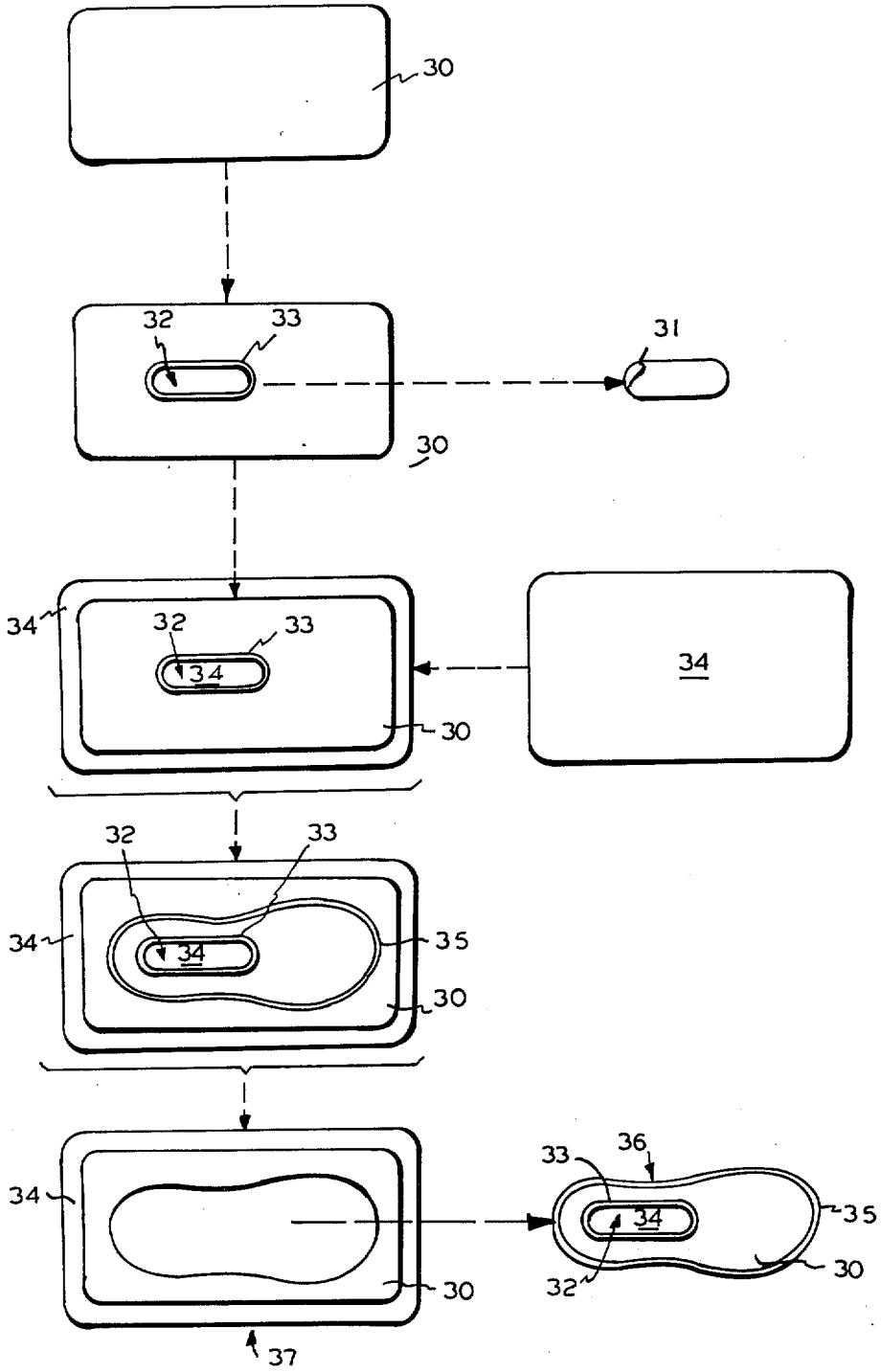
FIG. 4 is a schematic diagram illustrating a novel method according to which plastic slippers may be produced.

The above described method is illustrated in FIG. 4. In FIG. 4 a first sheet of thermoplastic foam 30 is punched to remove a generally oval piece 31 from the central portion thereof. The resultant aperture will eventually be the foot-opening 32 in the finished slipper. It is preferable, though not essential, that the periphery of the foot-opening be seared. This is accomplished by collapsing a narrow portion 33 of the material surrounding the opening and heating it while other compression. When the pressure and heat are removed, this narrow portion remains in a collapsed condition. It is believed to contribute to the appearance and strength of the finished article.

After the foot-opening is formed, a second sheet 34 of the thermoplastic material is brought face to face with the first sheet 30. The second sheet may be foam material or non-cellular plastic sheeting, although foam material is definitely preferred, since a more comfortable slipper will result. Alternatively, the first sheet may be non-cellular material and the second cellular.

Still another possible modification would be to provide a double sole in the slipper. For instance, the upper would be either cellular or non-cellular material and the lower would be in two layers, one of foam, the other of non-cellular material. There would be no departure from the present invention in making such modifications, since the substitution of cellular material for non-cellular material or the replacement of a single sheet of one kind or the other with two sheets, one of each kind, would not alter the sequence or relationship of the essential steps in our process. Therefore, although the description will proceed with a description in which both the first and second sheets are of foam material, no intention to exclude any of the above modifications or others should be inferred.

As can readily be observed from the drawings, the second sheet 34 completely covers the foot opening 32 when properly in place. Proper placement having been achieved the sheets are ready to be squeezed together in a narrow region 35 which is spaced outwardly from and surrounds the foot opening. This region should have an outline that is conformable to the human foot. This does not require that the aforesaid outline must look exactly like that of a foot. It means that the shape of the outline need only be close enough to that of a foot so that the finished product will fit the wearer's foot smoothly.

While the sheets of thermoplastic material are being squeezed together in the above-described region, heat is applied to the compressed material. The temperature is increased to the extent necessary to bring the material into a condition of coalescence or incipient melting, whereupon there is a blending together of the facing portions of the sheets 30 and 34 within region 35. Heating is continued for a period of time sufficiently long to insure the formation of a permanent bond between the sheets. Usually the time required is measured in seconds or fractions thereof.

The one remaining essential operation in the method is the separation of a complete slipper 36 from the waste material 37. Separation may occur at any time during or subsequent to compression of the material. It is accomplished by cutting, shearing, slicing or tearing away all of the material outward of the region in which sealing takes place, leaving all or at least a substantial portion of the seal intact and firmly attached to the material inward thereof. That portion of the first sheet 30 which remains in the slipper thus produced comprises the upper. The remaining portion of the second sheet 34 comprises the lower.

So far as the basic steps are concerned, the second method is similar to the first. The second however, is particularly adapted to substantially completely automatic mechanized production operations. Generally speaking, the second method involves: advancing an elongated strip of thermoplastic material in a longitudinal direction through a means for forming foot-openings; forming foot-openings in said strip at equally spaced intervals of length along said strip; subsequently bringing said first strip and a second strip of thermoplastic material into face to face contact with one another; advancing said first and second strips through a sealing operation; exerting firm pressure during said sealing operation on the exposed faces of both of said strips in a narrow region spaced outwardly from said foot-opening, said region having an outline generally conformable to the human foot; raising the temperature of said strips within said region to the temperature at which said strips will adhere to one another within said region; maintaining said temperature for sufficient time to insure the formation of a permanent bond between said strips in said region; and separating a slipper from the material lying outside of said region.

Those skilled in the art will readily recognize that the above method may be practised with a variety of equipment and in different modes. Thus, the material may be advanced relatively continuously with the various fabricating steps being performed by "flying" punches, cutters and dies. Or, in a preferred embodiment, the material may be advanced incrementally through equipment of the sort shown in FIGS. 5 and 9.

Figures 5, 6, 7, 8, 10, 11:
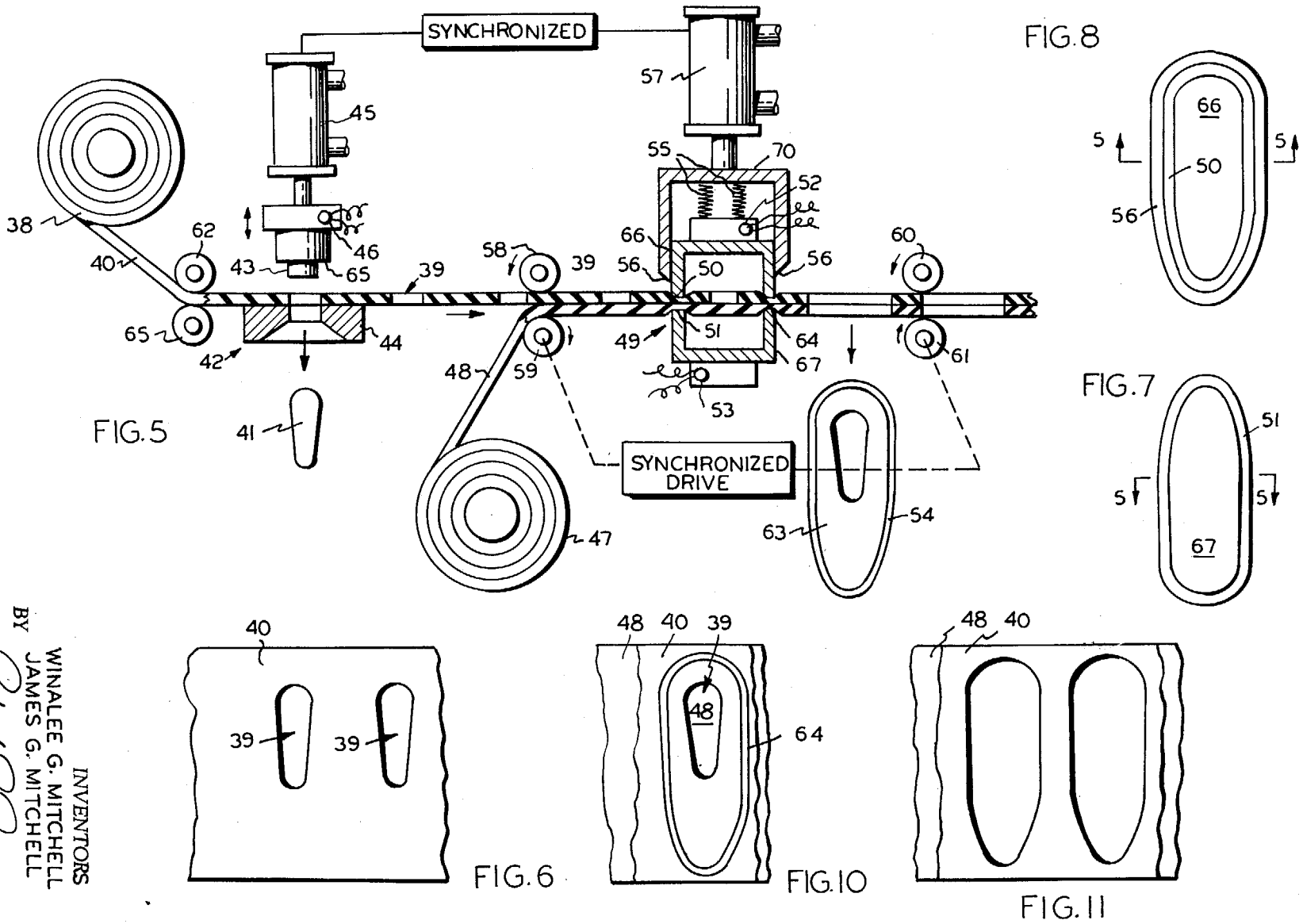
FIG. 5 is a partly sectional schematic diagram of a second method by which plastic slippers may be produced.
FIGS. 6, 10 and 11 are fragmentary views of the material under treatment in the FIG. 5 method.
FIGS. 7 and 8 are plan views of parts of the apparatus shown in FIG. 5, the section lines in these figures indicating the plane through which the FIG. 5 view is taken.

In the FIG. 5 embodiment, the first strip 40 unwinds from a feed roll 38 and is guided through rolls 62 and 65 which may be idler rolls or which may be driven in a manner to be explained hereafter. From the aforementioned rolls, the material proceeds to a punching station 42. At the punching station is a punch 43, powered by any suitable reciprocating motor means, such as a hydraulic press cylinder 45. In cooperation with a female die 44, situated below the material, the punch 43 is able to cut pieces 41 from the strip 40.

The strip 40 is advanced through punching station 42 incrementally. That is, its advancement occurs in a series of successive left to right longitudinal movements of equal length, each movement being followed by a short period in which the strip is stationary. The punch 43 functions each time the material comes to rest, resulting in the formation of a series of foot-openings 39 spaced apart from one another along the length of strip 40 as shown in FIGS. 5 and 6.

In the present embodiment, the foot-openings are disposed transversely of strip 40. It is apparent, however, that the foot-openings can also be formed lengthwise along said strip, although it would thus become necessary to increase the distance the strip would have to be advanced between each successive actuation of the punch 43. It is also apparent that whether the foot-openings are to be disposed longitudinally or transversely on said strip they may be punched in "gangs," that is, several at a time, with the aid of multiple punches.

Optionally, when using foam material, as is the case in the present embodiment, the punch may be provided with a heating element 46 and a shoulder portion 65 for searing the edge of the foot-opening 39. The punch and integral shoulder 65 are heated to the fusion temperature of the thermoplastic foam with the aid of the heater 46. Each time the punch functions, it is driven downwards until the foam material immediately adjacent the punch is crushed between shoulder 65 and the upper face of female die 44. The material is kept under hot compression for a sufficiently long period of time to insure permanent collapse of the crushed material. Then the punch is withdrawn. The result is that the foot opening is formed with an edge comprising a narrow ribbon of non-cellular material of reduced thickness into which the top and bottom surfaces of strip 40 blend. For the sake of simplicity, and because the searing of the edge of the foot-opening is not an essential step in the method, the seared edge is not shown in FIGS. 5–7.

Subsequent to the formation of the foot-openings, with or without searing, the strip 40 and a second strip 48 of thermoplastic material are brought together. The strip 48 is preferably devoid of holes, other than the natural voids in the cell structure of the plastic foam material. It unwinds from a supply roll 47 and is brought into face to face contact with strip 40 so that the foot-openings 39 are covered. The strips 40 and 48 are then moved together through a cutting and sealing station 49 where the strips are bonded together in a manner to be described.

At cutting and sealing station 49 there is a stationary lower sealing die 67 having an upwardly disposed horizontal die face 51, as shown in FIGS. 5 and 7. This die is provided with a heating element 53 by means of which the die face 51 can be raised to the fusion temperature of the thermoplastic foam material in strips 40 and 48. Directly above die face 51 and in registry therewith is the substantially identical, downwardly disposed horizontal die face 50 of upper sealing die 66, as shown in FIG. 8. Die 66 is provided with a heating element 52, similar to heating element 53.

Unlike lower die 67, upper die 66 reciprocates vertically. By means of any suitable reciprocating motor means 57, the upper die 66 is pressed firmly into contact with the strip 40 each time it comes to rest and is retracted before the material begins to move again. Thus, during those periods when the strips 40 and 48 are stationary, they are compressed for a time between the dies 66 and 67.

A shearing type cutter 56 is associated with the upper die 66. As will be noted from FIG. 8, the cutter is fitted closely about the entire periphery of die 66. Because the dies 66 and 67 have vertical walls and meet in substantially perfect registry, the cutter 56 can separate material clenched in the die from that lying outside of it. In order to more fully disclose how the cutting and sealing operation may be carried out, reference is now made to an enlarged view, FIG. 9, showing additional details of the dies schematically represented in FIG. 5.

Figure 9:
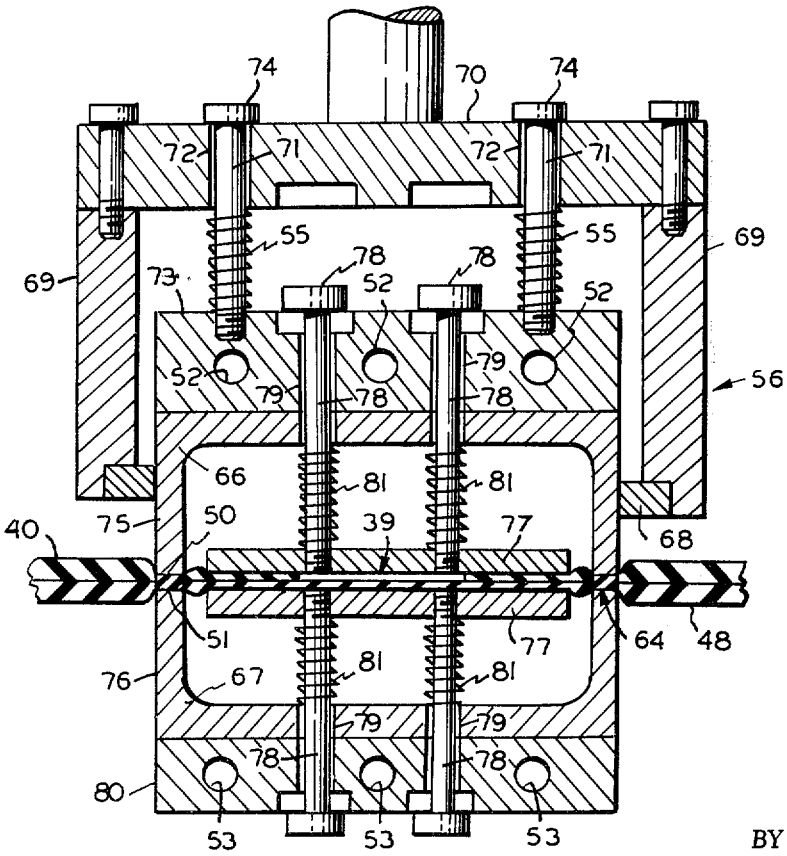
FIG. 9 is an enlarged sectional detailed view of parts of FIG. 5.

As shown in FIG. 9, the cutter 56 is generally in the shape of an inverted box which partially enclosed upper die 66. The cutter includes a base portion 70, attached to motor means 57 in the manner disclosed in FIG. 5, side walls 69 dependent from base 70 and a hardened cutting insert 68 secured in the lower edge of side walls 69. The insert 68 conforms to the exterior surface of the side walls 75 and 76 of the upper and lower dies 66 and 67 and rings the upper die. The upper die is suspended within the cutter assembly with the aid of bolts 71 which pass through holes 72 in cutter base 70 and threadably engage the upper die backing member 73. The bolts 71 have heads 74 which hang on the upper surface of the backing member. Springs 55 are wound about the bolts between base 70 and upper die backing member. The function of these springs will become apparent as the description unfolds.

The normal condition of the dies, that is their condition while the strips 40 and 48 are advancing, is open. The dies normally have sufficient clearance between them to permit the full thickness of both strips 40 and 48 to advance between them without catching. The stroke of the press actually exceeds the aforementioned clearance to the extent necessary to drive the cutter insert 68 at least partly below the surface of lower die face 51. However, since the springs 55 are interposed between the cutter base and the upper die, and because the cutter insert normally rides above upper die face 50, upper die 66 must come to rest and the springs 55 must be compressed to a significant extent before the cutter insert 68 drops below lower die face 51.

When the strips 40 and 48 come to rest, the upper die closes down onto the lower die. The size and strength of the springs 55 is sufficiently great to insure that as the press closes, those portions of strips 40 and 48 which are between die faces 50 and 51 will be substantially completely crushed therebetween before the springs 55 yield to any significant extent under pressure from the motor 57. Thus effective operation of the cutter is prevented until the strips are thoroughly immobilized by being clenched between the die faces. FIG. 9 illustrates that point in the operation of the cutter-die assembly when the foam material has collapsed but just before the springs yield. Finally the cutter does function severing the material within the dies 66 and 67, while still clenched therein from the surrounding portions of the strips.

Not only does cutting occur while the press is closed, but the sealing operation also takes place then. Sealing takes place in a narrow region of both strips 40 and 48 which corresponds in width to the width of die faces 50 and 51. The width of these faces is exaggerated slightly in FIG. 9 and even more so in FIGS. 5, 7 and 8 to facilitate their illustration.

FIG. 10 illustrates the condition of the material when it is clenched between the dies. The width of the aforesaid region, designated by numeral 64 in FIG. 10, corresponds in actual practice to that of the die faces 50 and 51, but is shown in FIG. 10 with a width more closely approximating its proper size.

Sealing takes place when the thermoplastic foam strips are crushed together in region 64 while absorbing sufficient heat from dies 66 and 67 to reach the temperature at which the collapsed strips coalesce with one another to form a bond. Coalescence is ideally carried to the point that so much of the cellular structure of the strips as is between the die faces is virtually destroyed, leaving behind a pliable, non-cellular seam 54 which remains in the final product. Bonding of the strip does not occur to any significant extent outside or region 54 because of the poor heat conductivity of the plastic foam.

It will be appreciated that it is not particularly critical whether the seam becomes completely developed before or after the cutter functions. However, it is necessary that the dies remain closed long enough to insure the formation of a good bond in the seam. This usually takes no more than a few seconds or fractions thereof.

Once both cutting and sealing have been accomplished, the upper die is again opened by reversal of motor 57. As the dies open, the strips of thermoplastic material again advance, and the completed slippers 63 leave the press and are separated from the remaining portions of strips 40 and 48, which are illustrated in FIG. 11. These remaining portions constitute the waste products of the present method. When the strips 40 and 48 again come to rest, the above described successive steps of closing the dies, forming a seal, cutting away waste material, opening the dies, further advancing the material and bringing the material to rest are repeated again and again on a continuous basis.

An optional added feature of the cutter-die assembly depicted in FIG. 9 is a pair of spring-loaded plates 77, secured inside the dies 66 and 67 respectively with the aid of bolts 78. The bolts 78 threadedly engage the aforesaid plates and pass through holes 79 in the dies 66 and 67 and in their respective backing members 73 and 80. Between each of the dies and the respective plate members are secured coil springs 81, which are wound about the bolts 78 and which are slightly less compressible than the thermoplastic foam material.

When the dies are open, each of the plate members 77 protrudes slightly from its die. When the die closes down upon the strips 40 and 48, the spring loaded plates exert pressure on the foam material encircled by the die faces 50 and 51, although not compressing the latter material to the same extent as the material in region 64. As a consequence of their relatively light grip on the material, and their somewhat indirect and loose contact with the heating elements 52 and 53 in die backing members 73 and 80, the plates 77 do not cause any bonding between the strips of thermoplastic foam material. Consequently, their sole function when the press is closed is to immobilize the material. In returning to their protruding condition when the dies open, the plates 77 will wrest free the slipper and the waste material in the event that they stick to either of the dies, thus facilitating their removal.

In order to practice our method in apparatus of the character described above, it is necessary to utilize some form of automatic mechanism for advancing the material through punching, sealing and cutting stations. One essential characteristic of a suitable advance mechanism is that it must bring the strips 40 and 48 to rest with the foot-openings 39 lying at the desired location within the die. Although it is possible to make slippers with foot-openings offset slightly to one side or the other, more often than not, a well-centered foot-opening will be found most desirable. In such a case, the strip 40 must come to rest between the dies 66 and 67 with the foot-openings centered over the longitudinal axes of the dies, or as close thereto as practicable.

This requirement is partially fulfilled by placing the punching station 42 and the cutting and sealing station 49 at a proper distance from one another, along the path followed by the plastic material. They should be separated from one another by a distance which is approximately equal to some whole number multiple of the length of each incremental movement of the material as it advances over said path. Thus, provided the material is not stretched to any substantial extent between the stations, the centers of the foot openings 39 should arrive at or about the centerline of the dies 50 and 51 each time the material comes to rest.

Not only is it necessary to carefully control the length of the path traversed by the punched strip 40 between stations, but also it is essential to control the length of the material itself. Polyurethane foam can be made in various gradations of elasticity from very little or none to very stretchy. The type of foam ordinarily used in making articles such as the slippers of the present invention is sufficiently stretchy to change in shape and length when being pulled from one operation to another.

In a system in which all operating forces are fairly constant and in which the tensile properties of the material under treatment are equally constant, the material can be fed by pulling it through the system from the downstream end with a constant pulling force. However, we have found that the above conditions constitute an ideal situation which is not always obtainable. Consequently, we have found that there is a need for a better method of feeding the foam material through the various process steps.

This need is satisfied in accordance with the invention by the adoption of a method of feeding which involves both pushing the foam material into and pulling it out of the sealing mechanism, thus relieving it of deforming tensions. The objects of the invention are attained in a measure by pushing and pulling the punched strip 40 while only pulling the lower strip 48. However, it is preferred that both the punched 40 and unpunched 48 strips be pushed as well as pulled. The pushing forces may be applied to the strips 40 and 48 separately, that is, before they come together. However, it is preferred that the strips be brought together prior to or practically at the same time as they are pushed towards the sealing and severing operation.

Any effective means for engaging the strips and moving them incrementally at a controlled rate and over a controlled distance may be used to provide the pushing and pulling forces for advancing the material. The main desideratum is that force be applied directly to the strips both ahead of and beyond the sealing and severing operation. This result can be obtained with the aid of any transport means which acts throughout some portion of the length of the strips which portion traverses the cutting and sealing operation. Alternatively, means acting upon the strips at spaced points both ahead of and beyond the cutting and sealing station may be used.

For instance, in the present embodiment, the "means acting upon the strips at spaced points both ahead of and beyond the cutting and sealing station" is a set of rollers. The set includes two pairs of rollers, a first pair, 58 and 59, ahead of said station and a second pair, 60 and 61, beyond said station. All of the rollers are driven by one common or several synchronized driving means so that each pair acts at the same rate, with the same amount of force and moves the material through the same distance as the other. The rollers 62 and 65 may also be tied into the same driving system, if desired.

A complete system will also include suitable means for synchronizing the operation of the motors 45 and 57 with the work advancing mechanism. The main objective is to insure that both the foot-opening punch and the cutter-sealer mechanism contact the material only when it is at rest. This objective can be easily attained through the use of electric rotary switch type timer clocks or electronic sequence timers, hydraulic pumps, solenoid valves, limit switches and other control apparatus with which those skilled in this art are already quite familiar. Therefore, they have merely been indicated schematically in the drawings. This completes a description of a preferred embodiment of our second method.

It will be readily apparent that the general description of our second method is of sufficiently broad scope to cover many embodiments other than the preferred one described above. Although it is not necessary and would probably be impossible to adequately describe all the possible embodiments of this method in detail, a few particularly interesting ones will be mentioned briefly.

The above preferred embodiment illustrates how the invention may readily be practiced with "thermal" heat sealing apparatus. Our invention may also be practised with "electronic" sealing apparatus. These two types of apparatus, although they are both "thermal" in a sense, are distinguishable with regard to the manner of applying the heat to the work. In thermal sealing apparatus, the heat is transferred solely by direct conduction of heat units from a preheated die directly to the material which the die contacts under pressure. U.S. Pat. No. 2,425,388 is an example of this type.

In the so-called electronic type of apparatus, the heat is developed in the material at least in part by subjecting the material to a high frequency alternating field. An example of this type is found in U.S. Pat. No. 2,796,913. Electronic apparatus customarily includes auxiliary heating means of the thermal type. In such a case, the heat is applied to the material partly by conduction and partly by induction. For example, see U.S. Pat. No. 3,026,233.

During the sealing operation, the foam material is squeezed down to a fraction of its uncompressed thickness in the region where sealing takes place. Any effective means of compressing the material may be used. In the case of thermal sealing equipment, the member that transmits both pressure and heat to the material is ordinarily a metal-faced die corresponding to the shape of the desired seam. In electronic equipment, the members between which the sheets of foam are squeezed often comprise a die which is formed basically of metal, but has a facing of Fiberglas reinforced heat-resistant polymer backed up by a layer of elastomeric material intermediate the metal and the facing.

The severing operation may take place while the work is in the grasp of the compression means or after it is released therefrom, the former mode of operation being preferred. The cutting means employed may be manual or mechanical, the latter being preferred for reasons or uniformity of operation, speed and economy. Among the available alternative mechanical means are shearings such as the one illustrated above, shearing dies, cutting dies and cutting wires. Some of these alternative cutting means are illustrated in U.S. Pat. Nos. 3,015,601, 3,025,206, and 2,425,388.

From the above description of our methods, it is clear that they are sufficiently versatile to be practised in a variety of types of equipment, only a few preferred representatives of which have been mentioned. Those skilled in the art will readily adapt our methods to types of apparatus not disclosed herein without departing from the steps of our methods. These methods have the advantages of producing articles with a minimum of handling of materials during and prior to production. They can be performed at a great rate of speed with a high degree of product uniformity and few rejects. They are readily adaptable to machinery in which ganged dies, sealing mechanisms and severing means are used to turn out a plurality of objects for each cycle of machine operation.

Having described not only our novel articles of manufacture and methods but also apparatus for carrying out said methods, we wish it to be understood that our methods are not restricted to the particular apparatus disclosed herein nor are our methods of manufacture restricted to the particular products disclosed herein, except to the extent that such restrictions are clearly expressed in the appended claims. Therefore, it should be understood that where a certain step is recited in the appended method claims, reference should not be made to the specification for the purpose of introducing limitations germaine to the products or exemplary apparatus disclosed herein.

What we desire to protect by United States Letters Patent is:

1. A method of manufacturing slippers of heat-sealable synthetic polymeric sheeting material, comprising:

advancing a first elongated strip of said material in a longitudinal direction through a foot-opening forming operation;

forming foot-openings at equally spaced distances along said strip;

subsequently bringing said first strip and a second strip of said material into face to face contact with one another;

advancing said first and second strips together through a cutting and sealing operation by pushing said strips toward said operation from one side thereof and pulling or withdrawing said strips from the other side of said operation, said pushing and pulling being performed with equal force, over equal distances and at the same time;

during said cutting and sealing operation, exerting firm pressure on the exposed faces of both of said strips in at least one narrow region surrounding one of said foot-openings, said region being spaced outwardly from said one foot-opening and having an outline generally conformable to the human foot;

raising the temperature of said strips within said region to the temperature at which said strips will coalesce with one another within said region;

maintaining said temperature until said strips are permanently bonded in said region; and separating a completed slipper from the material lying outside of said region.

2. A method according to claim 1 wherein said strips are advanced incrementally.

3. A method according to claim 1 wherein at least one of said strips is of stretchy plastic foam material.

4. A method according to claim 1 wherein the separating operation is performed while said strips are still under pressure.

5. A method of manufacturing slippers of heat-sealable synthetic polymeric sheeting material, comprising:

advancing a first elongated strip of said material in a longitudinal direction through a foot-opening forming operation;

forming elongated foot-openings at equally spaced distance along said strip;

subsequently bringing said first strip and a second strip of said material into face to face contact with one another;

exerting firm pressure on the exposed faces of said strips in at least one narrow region surrounding one of said foot-openings, said region being spaced outwardly from said foot-opening and having an elongated outline generally conformable to the human foot, said outline being elongated in generally the same direction as said foot-opening;

raising the temperature of said strips within said region to the temperature at which said strips will coalesce with one another within said region;

maintaining said temperature until said strips are bonded within said region; and separating a completed slipper from the material lying outside of said region.

6. A method according to claim 5 wherein at least one of said strips has a cellular structure.

7. A method according to claim 5 wherein the application of heat is accomplished with the aid of a heated die, having a face corresponding to the shape of said region.

8. A method according to claim 7 wherein all of the heat required to unite said strips is applied thereto by direct conduction from said die.

[9. A method of manufacturing slippers of heat-sealable synthetic polymeric sheeting material comprising:

forming an elongated foot-opening in a first sheet of said material;

subsequently bringing said first sheet together with a second sheet of said material in face to face relationship;

exerting firm pressure on the exposed faces of said sheets in at least one narrow region surrounding said foot-opening, said region being spaced outwardly from said foot-opening and having an elongated outline generally conformable to the human foot, said outline being elongated in generally the same direction as said foot-opening;

raising the temperature of said sheets within said region to unite said sheets with one another within said region; and separating a slipper from the material lying outside of said region.]

10. A method according to claim [9] *11* wherein both of said sheets are of stretchy cellular material.

*11. A method of manufacturing slippers of a heat-sealable synthetic polymeric sheeting material comprising:*

*providing first and second sheets of the synthetic polymeric sheeting material, at least one of which is stretchy cellular material;*

*forming an elongated foot opening in the first sheet of said material;*

*subsequently bringing the first sheet together with the second sheet of said material in face to face relationship;*

*exerting firm pressure on the exposed faces of the sheets in at least one narrow region surrounding the foot opening, said region being spaced outwardly from the foot opening and having an elongated outline generally conformable to the human foot, said outline being elongated in generally the same direction as said foot opening;*

*raising the temperature of the sheets within said region to unite said sheets with one another within said region;*

*searing the periphery of the foot opening by collapsing a narrow portion of the material surrounding the opening and heating it while under compression; and*

*separating a slipper from the material lying outside of said region.*

*12. The method of claim 11 wherein said slipper is separated from said material lying outside of said region by shearing.*

*13. The method of claim 11 wherein said foot-openings are formed by punching.*

*14. The method of claim 11 wherein the application of heat is accomplished with the aid of a heated die having a face corresponding to the shape of said region.*

*15. The method of claim 14 wherein all of the heat required to unite said sheets is applied thereto by direct conduction from said die.*

*16. The method of claim 11 wherein the separating operation is performed while said sheets are still under pressure.*

*17. The method of claim 11 wherein at least one of said sheets is polyurethane foam.*

*18. The method of claim 6 wherein said slipper is separated from said material lying outside of said region by shearing.*

*19. The method of claim 6 wherein said foot-openings are formed by punching.*

*20. The method of claim 6 wherein the separating operation is performed while said strips are still under pressure.*

*21. The method of claim 6 which further includes searing the periphery of the foot-opening by collapsing a narrow portion of the material surrounding the opening and heating it while under compression.*

*22. The method of claim 5 wherein at least one of said strips is polyurethane foam.*

*23. The method of claim 5 wherein both of said strips are of stretchy cellular material.*

24. The method of claim 3 wherein said slipper is separated from said material lying outside of said region by shearing.

25. The method of claim 3 wherein said foot-openings are formed by punching.

26. The method of claim 3 wherein the application of heat is accomplished with the aid of a heated die having a face corresponding to the shape of said region.

27. The method of claim 26 wherein all of the heat required to unite said strips is applied thereto by direct conduction from said die.

28. The method of claim 3 which further includes searing the periphery of the foot-opening by collapsing a narrow portion of the material surrounding the opening and heating it while under compression.

29. The method of claim 1 wherein at least one of said strips is polyurethane foam.

30. The method of claim 1 wherein both of said strips are of stretchy cellular material.

31. A method of manufacturing slippers of heat sealable polyurethane foam material comprising:

punching an elongated foot-opening in a first sheet of polyurethane foam;

subsequently bringing said first sheet together with a second sheet of polyurethane foam in face to face relationship;

exerting firm pressure on the exposed faces of said sheets in at least one narrow region surrounding said foot-opening, said region being spaced outwardly from said foot-opening and having an elongated outline generally conformable to the human foot, said outline being elongated in generally the same direction as said foot-opening;

raising the temperature of said sheets within said region to unite said sheets with one another within said region; wherein, the application of heat is accomplished with the aid of a heated die having a face corresponding to the shape of said region;

searing the periphery of the foot-opening by collapsing a narrow portion of the material surrounding the opening and heating it while under compression; and separating a slipper from the material lying outside of said region while said sheets are still under pressure.

32. A method of manufacturing slippers of heat-sealable polyurethane foam material, comprising:

advancing a first elongated strip of polyurethane foam in a longitudinal direction through a foot-opening forming operation;

punching elongated foot-openings at equally spaced distances along said strip;

subsequently bringing said first strip and a second strip of polyurethane foam into face to face contact with one another;

exerting firm pressure on the exposed faces of said strips in at least one narrow region surrounding one of said foot-openings, said region being spaced outwardly from said foot-opening and having an elongated outline generally conformable to the human foot, said outline being elongated in generally the same direction as said foot-opening;

raising the temperature of said strips within said region to the temperature at which said strips will coalesce with one another within said region; and wherein the application of heat is accomplished with the aid of a heated die having a face corresponding to the shape of said region;

maintaining said temperature until said strips are bonded within said region;

searing the periphery of the foot-opening by collapsing a narrow portion of the material surrounding the opening and heating it while under compression; and separating a completed slipper from the material lying outside of said region while said strips are still under pressure.

33. A method of manufacturing slippers of heat-sealable stretchy cellular material comprising:

advancing a first elongated strip of said material in a longitudinal direction through a foot-opening forming operation;

punching foot-openings at equally spaced distances along said strip;

subsequently bringing said first strip and a second strip of said material into face to face contact with one another;

advancing said first and second strips together through a cutting and sealing operation by pushing said strips toward said operation from one side thereof and pulling or withdrawing said strips from the other side of said operation, said pushing and pulling being performed with equal force, over equal distances and at the same time;

during said cutting and sealing operation, exerting firm pressure on the exposed faces of both of said strips in at least one narrow region surrounding one of said foot-openings, said region being spaced outwardly from said one foot-opening and having an outline generally conformable to the human foot;

raising the temperature of said strips within said region to the temperature at which said strips will coalesce with one another within said region; wherein the application of heat is accomplished with the aid of a heated die having a face corresponding to the shape of said region;

maintaining said temperature until said strips are permanently bonded in said region; and separating a completed slipper from the material lying outside of said region while said sheets are still under pressure.

34. The method of claim 33 wherein the strips are advanced incrementally.

35. A method of manufacturing slippers of heat-sealable stretchy cellular material comprising:

incrementally advancing a first elongated strip of said material in a longitudinal direction through a foot-opening forming station;

punching foot openings at equally spaced distances along said strip while it is at rest at said foot-opening forming station;

advancing said first elongated strip from said foot-opening forming station along a path of advancement extending to a cutting and sealing station, said punching station and said cutting and sealing station being separated by a distance along said path approximately equal to a whole number multiple of the length of each incremental movement of the material as it advances over said path;

bringing said first strip and a second strip of said material together along said path between said punching station and said cutting and sealing station;

incrementally advancing said first and second strips together through said cutting and sealing station;

performing the advancing of said first strip through said punching station and the advancing of said first

*and second strips together through said cutting and sealing station by pushing said strips towards said stations from one side thereof and pulling or withdrawing said strips from the other side of said stations, said pushing and pulling being performed with equal force, over equal distances and at the same time;*

*at said cutting and sealing station, exerting firm pressure on the exposed faces of both of said strips while they are at rest in at least one narrow region surrounding one of said foot openings, said exerting of pressure being synchronized with the punching of said foot openings in said first elongated strip, said region being spaced outwardly from said one foot opening and having an outline generally conformable to the human foot;*

*raising the temperature of said strips within said region to the temperature at which said strips will coalesce with one another within said region;*

*maintaining said temperature until said strips are permanently bonded in said region; and*

*separating a completed slipper from the material lying outside of said region.*

* * * * *